US011105702B2

(12) United States Patent
Rodríguez-Casiano

(10) Patent No.: US 11,105,702 B2
(45) Date of Patent: Aug. 31, 2021

(54) DEVICE AND METHOD FOR DETECTING CYLINDER LEAKS

(71) Applicant: José Antonio Rodríguez-Casiano, Barceloneta, PR (US)

(72) Inventor: José Antonio Rodríguez-Casiano, Barceloneta, PR (US)

( * ) Notice: Subject to any disclaimer, the term of this patent is extended or adjusted under 35 U.S.C. 154(b) by 119 days.

(21) Appl. No.: 16/682,890

(22) Filed: Nov. 13, 2019

(65) Prior Publication Data

US 2021/0140843 A1 May 13, 2021

(51) Int. Cl.
*G01M 3/26* (2006.01)
*G01M 15/02* (2006.01)
*G01M 3/02* (2006.01)

(52) U.S. Cl.
CPC .............. *G01M 3/025* (2013.01); *G01M 3/26* (2013.01)

(58) Field of Classification Search
CPC .... G01M 3/00–02; G01M 3/025; G01M 3/26; G01M 15/00–02; G01M 99/00
See application file for complete search history.

(56) References Cited

U.S. PATENT DOCUMENTS

| | | |
|---|---|---|
| 3,224,260 A | 12/1965 | Lankford |
| 4,617,824 A | 10/1986 | Cybulski et al. |
| 5,369,982 A | 12/1994 | Holthaus |
| 5,569,841 A | 10/1996 | Hoban et al. |
| 5,795,995 A | 8/1998 | Shimaoka et al. |
| 6,298,716 B1 | 10/2001 | Havice |
| 7,581,433 B2 | 9/2009 | Sellers |
| 7,860,670 B2 | 12/2010 | Bethmann |
| 9,016,109 B1 | 4/2015 | Miguez et al. |
| 9,880,065 B1 | 1/2018 | Miguez et al. |
| 2012/0279282 A1* | 11/2012 | Williams .............. G01M 3/025 73/49.7 |

* cited by examiner

*Primary Examiner* — Nguyen Q. Ha
(74) *Attorney, Agent, or Firm* — Hector M. Reyes Rivera

(57) ABSTRACT

The invention is directed to a device for detecting cylinder leaks in an individual cylinder of an internal combustion engine having the cylinder head disassembled and wherein the piston in the tested cylinder is positioned at the bottom dead center and wherein a dual gauge leak-down tester is coupled to the herein disclosed device. The device has an internal airtight channel that allows pressurized air to enter from a pressurized air source to the device via a dual gauge leak-down tester and a set of clamps that acting as a security system, allows the user to firmly secure the device on the engine block. Once the device is assembled and secured above the cylinder and pressurized air is allowed to enter the cylinder through the device, leaks in the cylinder or its internal components are detected by comparing the percentage of air pressure indicated by each one of the gauges of the tester in a conventional manner.

11 Claims, 12 Drawing Sheets

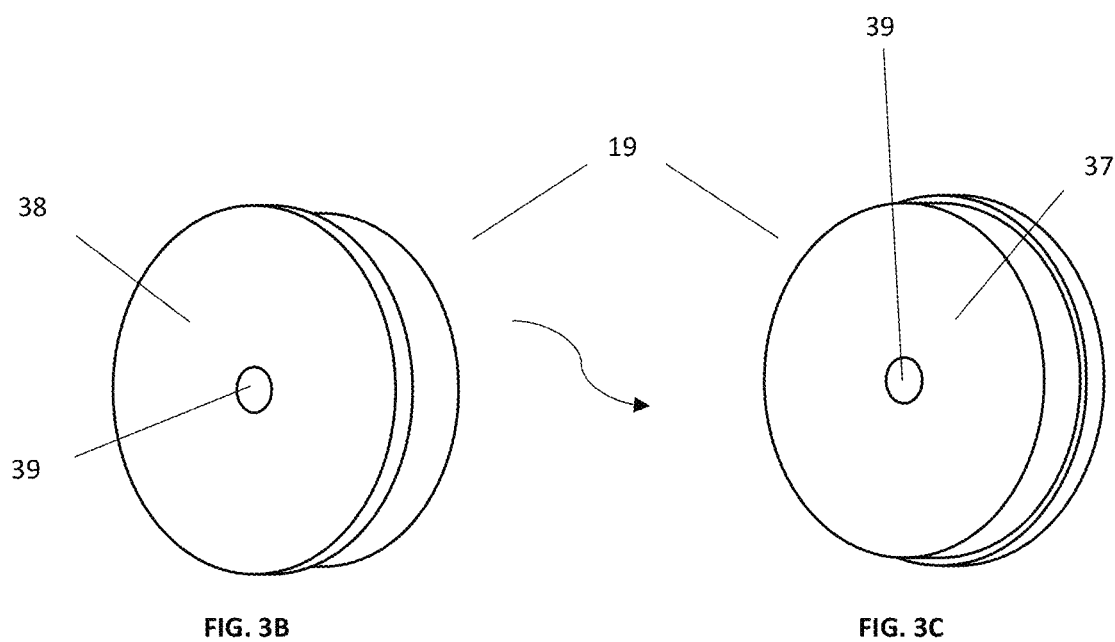

DEVICE AND METHOD FOR DETECTING CYLINDER LEAKS

TECHNICAL FIELD

The invention relates to a device for detecting cylinder leaks in an individual cylinder of an internal combustion engine having the cylinder head disassembled and wherein the piston in the tested cylinder is positioned at the bottom dead center and wherein a dual gauge leak-down tester is coupled to the herein disclosed device.

BACKGROUND

The internal combustion engine has been a fundamental life-changing invention for humanity. It allows the conversion of chemical energy into mechanical work, which is achieved via the combustion of a gaseous mixture of fuels and an oxidizing agent, usually air, under high temperature and pressure conditions. Thus, this combustion must be performed in a confined location, well known as a combustion chamber. This gaseous mixture is compressed by the movement of a piston up to the top section of the cylinder, thus concentrating the gaseous mixture by reducing the area of the combustion chamber, wherein said mixture is confined and once the concentrated gaseous mixture is igniting by the sparking plug, the explosion of the gaseous mixture generates high pressure and high-temperature gases, that quickly pushes and accelerates the downward motion of the piston. In this manner, the chemical energy of the gaseous mixture is converted to mechanical energy which is transferred to the piston. Said mechanical energy is subsequently transferred from the piston to a rotating shaft. Thus, for an internal combustion engine to function properly and efficiently, the gaseous composition subjected to compression and combustion must be kept confined under pressure inside the combustion chamber; in other words, leaks must be avoided or drastically minimized.

Ideally, leaks of said gaseous composition from the combustion chamber should not occur, nonetheless, in a practical sense, some degree of leaks of said composition does take place and are expected without drastically affecting the engine performance. The percentage of permissible or expected leakage of said gaseous composition is most of the time determined by the manufactures. However, when the percentage of said leakage is higher than expected, the proper functioning of the engine is negatively affected since the concentration of the composition to be ignited is decreased and thus, the generated mechanical work from said combustion is therefore reduced. Continuous use of the engine usually promotes such leaks due to the wear and tear of the engine components related to the combustion chamber such as but not limited to the piston, piston rings, valves, or cylinder wall wear. Therefore, engine lack of performance, diagnosis, maintenance, and repair processes regularly require testing the ability of the combustion chamber to properly confine the gaseous mixture subjected to combustion.

Detecting said leaks, is generally done by performing a Leak-Down Test, which is a well-known and conventional test wherein a commercially available Dual Gauge Leak-Down Tester is required. In general, said tester allows and measures an input of air pressure inside an engine, while allows the measure of the pressurized air escaping from the combustion chamber. The leak detection test requires that the engine must be turned off, the cylinder head must be properly assembled to the cylinder block, the intake and exhaust valves must be closed, and that the piston to be tested must be positioned at its top dead center. On one hand, the leak-down test is performed by coupling the tester to an air-compressed source, such as an air compressor, and on the other hand, to the spark plug hole of the cylinder under testing and subsequently, feeding pressurized air into the cylinder. One of the gauges in the tester measures the percentage of air pressure that is being introduced in the cylinder from the compressed air source, while the second gauge measures the percentage of air pressure that is leaking out from the combustion chamber. If a leak is detected, air pressure must be escaping from one or more of the following engine parts: intake valve, exhaust valve, piston rings, head gasket, cracked cylinder head or the cylinder itself may be damaged, worn-out, and/or cracked.

A serious limitation of the leak down test is that a false reading may be obtained if the piston is not properly set up at its top dead center, since air may escape through partially open valves. Similarly, if the piston is set properly at its dead top center, the test is limited only to the area enclosed by the engine head and the upper section of the engine block that constitutes the combustion chamber and its components. However, it does not include the lower section of the cylinder, or the cylinder block section located under the piston rings. Thus, if the results of the leak-down test indicate that there is a significant leak in the cylinder—the leak may be presumed to occur only in any section of the combustion chamber, located in the area under the engine head and the top of the cylinder—cylinder block—under test or the engine's valves, but there may also be additional leaks in the lower section of the cylinder or cylinder block, the piston and the piston rings since the piston is on its top dead center during the test, said engine sections are not subjected to the air pressure test and thus, leaks in said areas may be ignored or undetected. On the other hand, if the leak-down test detects only leaks within the acceptable parameters or no leaks at all, even though that a leak is suspected or a lack of compression is detected, such leakage may very well be found in the lower section of the cylinder or cylinder block, the piston or piston rings that are not subjected to and not detectable by the conventional leak down test. Thus, the leak detection and engine repair process would require disengaging the engine into parts, which is time-consuming and hard work, which results in higher reparation costs to Clients.

Therefore, there is a need to perform a more accurate, convenient, economical, direct, and simple cylinder leak test that includes the complete main body of the cylinder, particularly a test able to detect leaks due to piston, piston rings, or the lower section of the cylinder or cylinder block.

SUMMARY OF THE INVENTION

The herein invention provides an apparatus for detecting leaks at different sections of the cylinder, piston, and piston rings in an open cylinder of an engine block having the head dissembled and having the piston of the tested cylinder positioned at a predetermined fixed position, including the lower dead center position. The device is positioned and further secured above the cylinder mouth by employing the engine head bolts and it must be coupled to a dual gauge leak-down tester in order to introduce pressurized air within the cylinder. In this manner, the percentage of air pressure coming inside the cylinder and the percentage of air pressure escaping from the interior of the cylinder are measured to detect potential leaks in the cylinder, piston, and piston rings. The invention also provides a more precise test to properly detecting engine leaks and precisely identifying the engine components producing, generating, or responsible for such leaks, including engine sections that are not subjected to leak detection in conventional leak detection tests. In this manner, if no engine leaks are identified with the herein disclosed tool, there will be no need to disassemble and repair the lower engine section, saving time and engine reparation costs to the engine's owner.

BRIEF DESCRIPTION OF THE DRAWINGS

The foregoing and additional features and characteristics of the embodiments of the present invention will become more apparent from the following detailed description considered with reference to the accompanying drawings, which are used herein in a manner of example only, and wherein:

FIGS. 3B and 3C illustrate perspective views of the base of the device, according to the invention.

FIGS. 11A and 11B illustrate perspective views of an engine head bolt and spacer ready to be used in the installation of the invention above a cylinder.

DETAILED DESCRIPTION OF THE INVENTION

Figure 1:
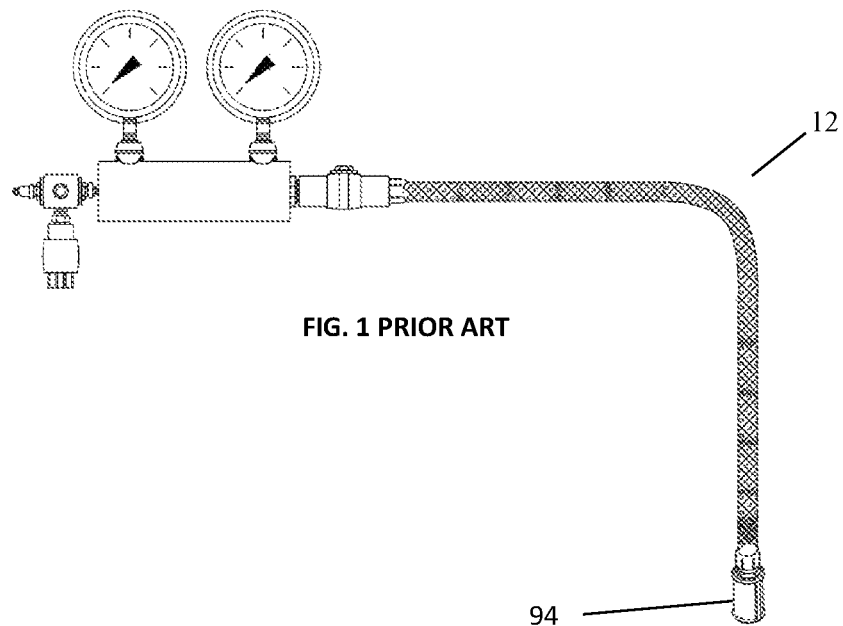
FIG. 1 illustrates a conventional and commercially available dual gauge leak down tester.

The present invention and its detailed embodiments are disclosed herein. This invention may, however, be embodied in many different forms and should not be construed as limited to the embodiments set forth herein. Rather, these embodiments are provided so that this disclosure will be thorough and complete, and will fully convey the scope of the invention to those skilled in the art. It is to be understood that the disclosed embodiments are merely exemplary of the invention that may be embodied in various and alternative forms within the scope of the invention. Therefore, specific structural and functional details disclosed herein are not to be interpreted as limiting, but merely as a representative basis for the claims and/or as a representative basis for teaching one skilled in the art how to make and to use the present invention. It is thus to be understood that this invention is not limited to particularly exemplified structures, components, methods or uses, as such may, of course, vary. In the drawings, the size and relative sizes of regions may be exaggerated for clarity. The drawings are not necessarily to scale; some features may be exaggerated or minimized to show details of components or parts. It is also to be understood that the terminology used herein is to describe embodiments of the invention only and is not intended to limit the scope of the invention in any manner. It must be noted that, as used in this specification and the appended claims, the singular forms "a", "an" and "the" include plural referents unless the context dictates otherwise. Similarly, it will be understood that when an element is referred to as being "on", "connected to" or "coupled to" another element or layer, it can be directly on, connected, or coupled to the other element or intervening elements may be present. On the other hand, when an element is referred to as being "directly on," "directly connected to" or "directly coupled to" another element, there are no intervening elements present. Like numbers refer to like elements throughout. As used herein, the term "and/or" includes all combinations of one or more of the associated listed items.

It will be understood that, although the terms "first", "second", "third" and the like, are used as a relative reference to any other part of the invention, in order to properly explain and identified the particular details of the invention, and that such terms may be used herein to describe various elements, components, regions and/or sections, these elements, components, regions and/or sections should not be limited by these terms. These terms are only used to distinguish one element, component, region, or section from another element, component, region, or a section. Thus, a first element, component, region, or section discussed below could be termed a second element, component, region, or section without departing from the teachings of the present invention. Furthermore, spatially relative terms, such as "beneath," "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the exemplary term "below" can encompass both an orientation of above and below. The device may be otherwise oriented or subjected to a rotation in each orientation and the spatially relative descriptors used herein interpreted accordingly. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Since there are different sizes of cylinders and engines, the herein disclosed device and its components are illustrated in relative sizes to the illustrated cylinder, and it understood that the size of the device and its components may increase or decrease relative to the size of the cylinder upon which the device is used or intended to be used.

Figure 9A:
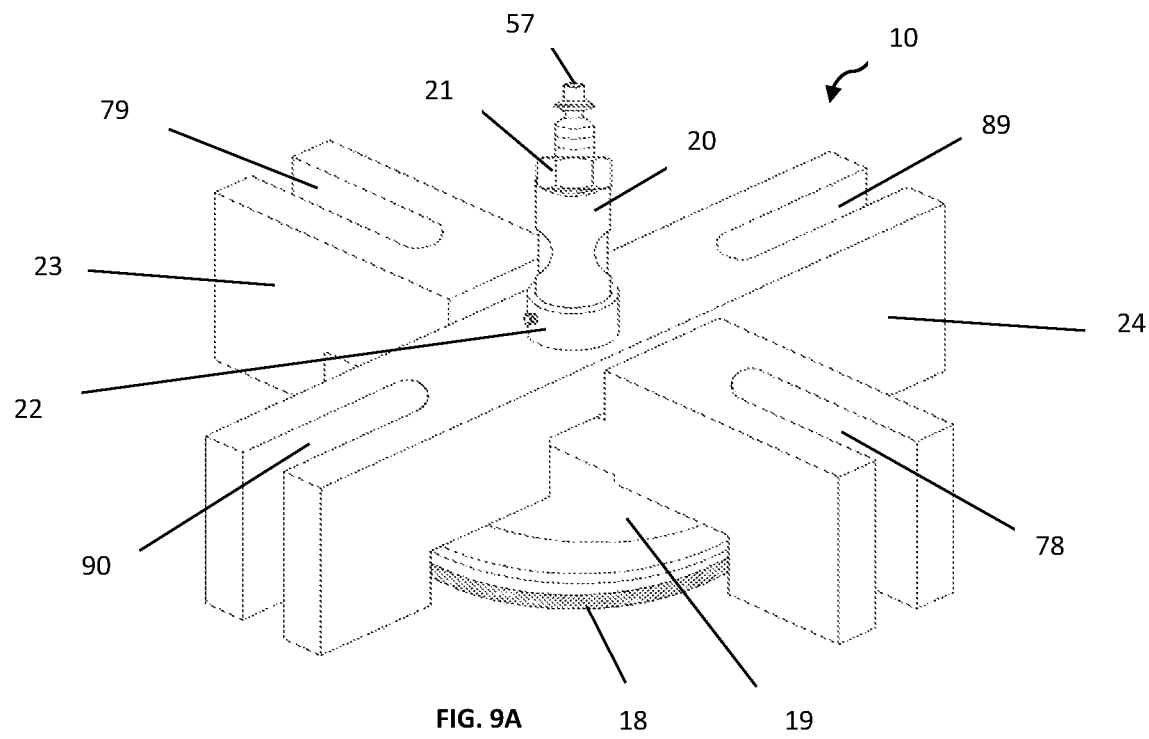
FIG. 9A illustrates a perspective view of the device already assembled, according to the invention.
Figure 9B:
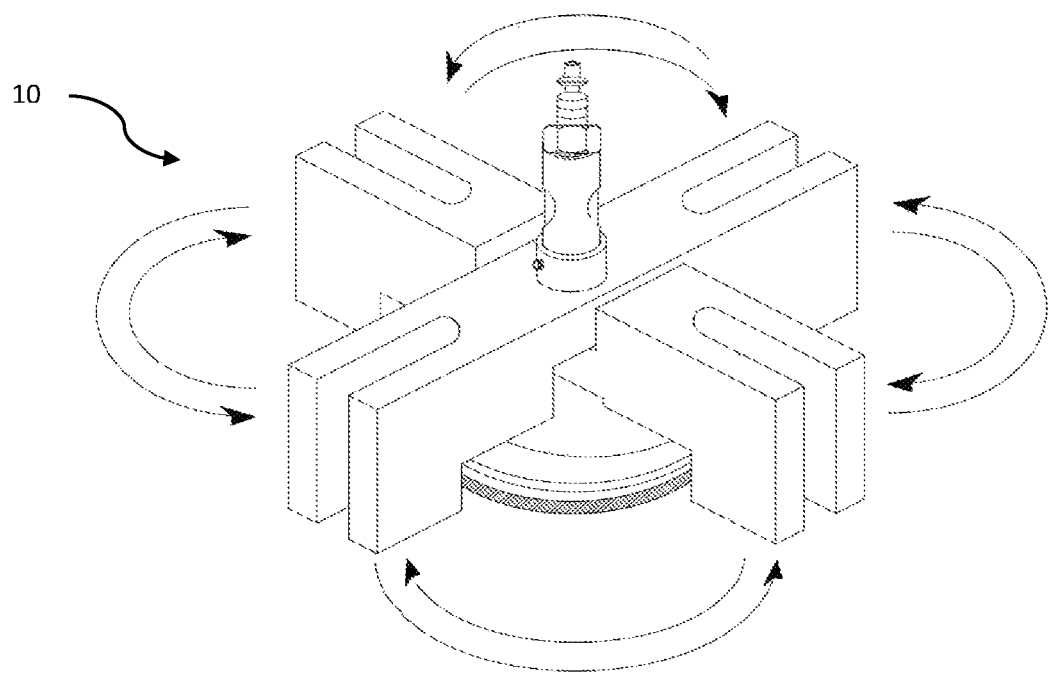
FIG. 9B illustrates a perspective view of the invention already assembled, suggesting potential lateral movements of the upper and lower clamps to the left and right, in reference to the other components of the device, according to the invention.

In general terms, the instant invention comprises device 10, for detecting cylinder leaks directly in an individual cylinder 15 of an open internal combustion engine block 14, which has its cylinder head disassembled from the engine block and wherein the piston of the cylinder under testing has been rotated or positioned at its lower point in the cycle. In FIG. 9A and FIG. 9B, are illustrate perspective views of the device 10 already assembled.

Figure 12A:
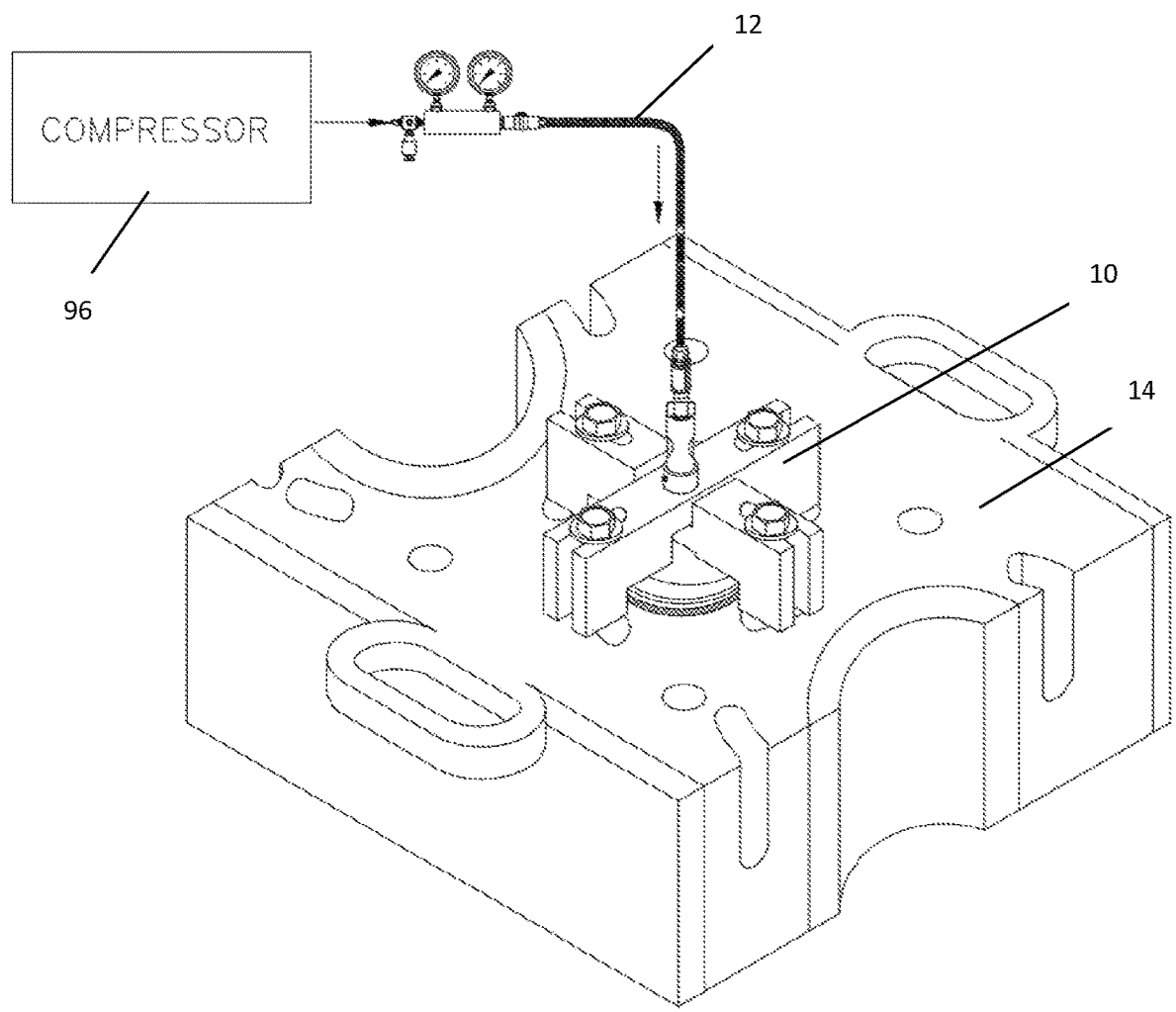
FIG. 12A illustrates a view of the device already installed above a mouth of a cylinder of an open combustion engine block and already coupled to a dual gauge leak-down tester.
Figure 12B:
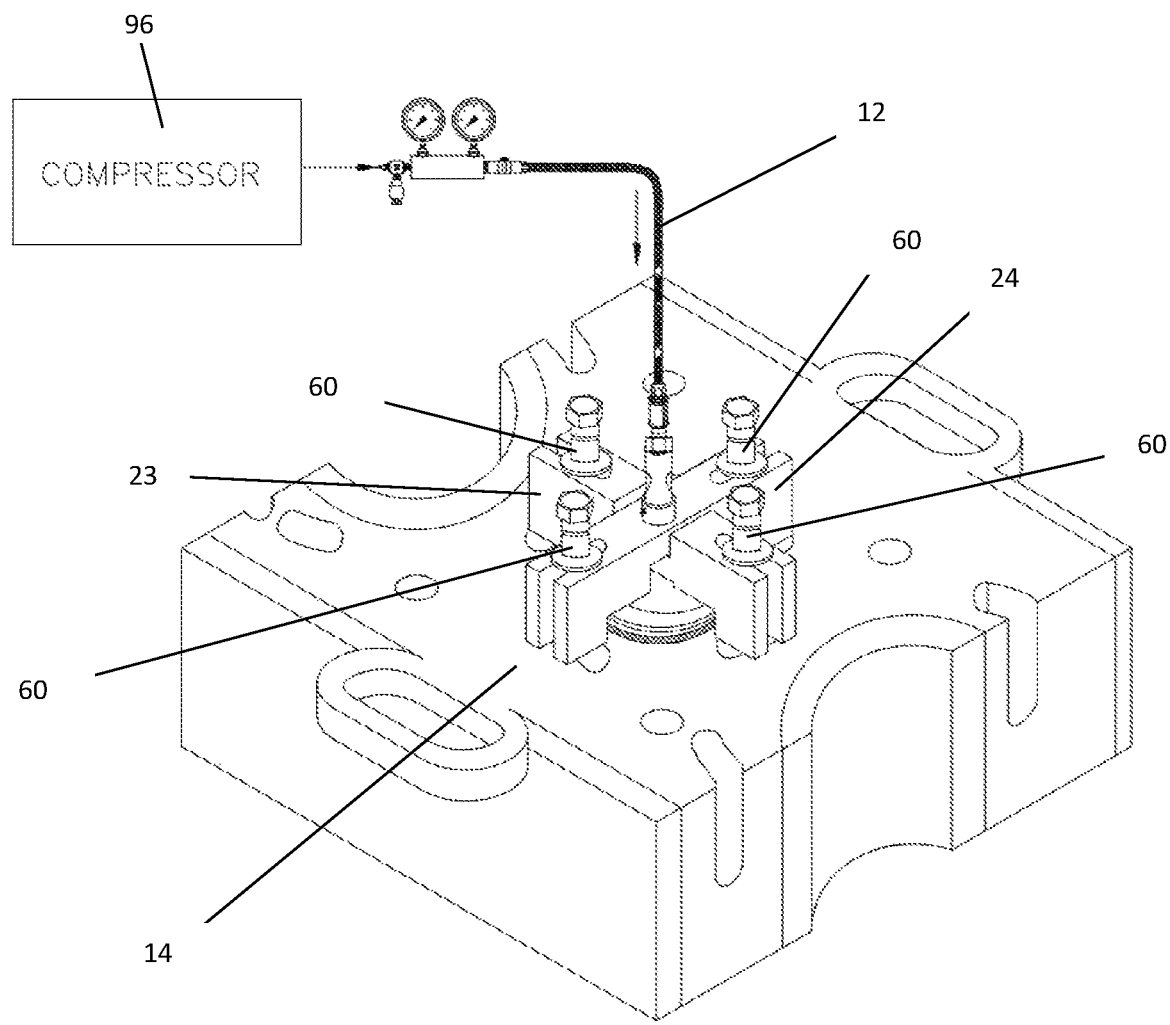
FIG. 12B illustrates a perspective view of the device, which is illustrated already installed above a cylinder of an open combustion engine block and already coupled to a dual gauge leak-down tester ready and wherein the engine head bolts are inserted into bolt spacers.

Device 10 is used in conjunction with a conventional dual gauge leak-down tester 12, which is illustrated in FIG. 1, as explained below, in order to detect leaks in cylinder 15. Alternatively, device 10 may also be used with any other types of dual gauge leak-down testers of higher airflow sensitivity than the conventional ones. The use of device 10 in conjunction with a conventional dual gauge leak-down tester 12 is illustrated in FIG. 12A and FIG. 12B, wherein device 10 is illustrated already installed above a mouth of a cylinder of an open combustion engine block and already coupled to dual gauge leak-down tester 12.

Figure 2:
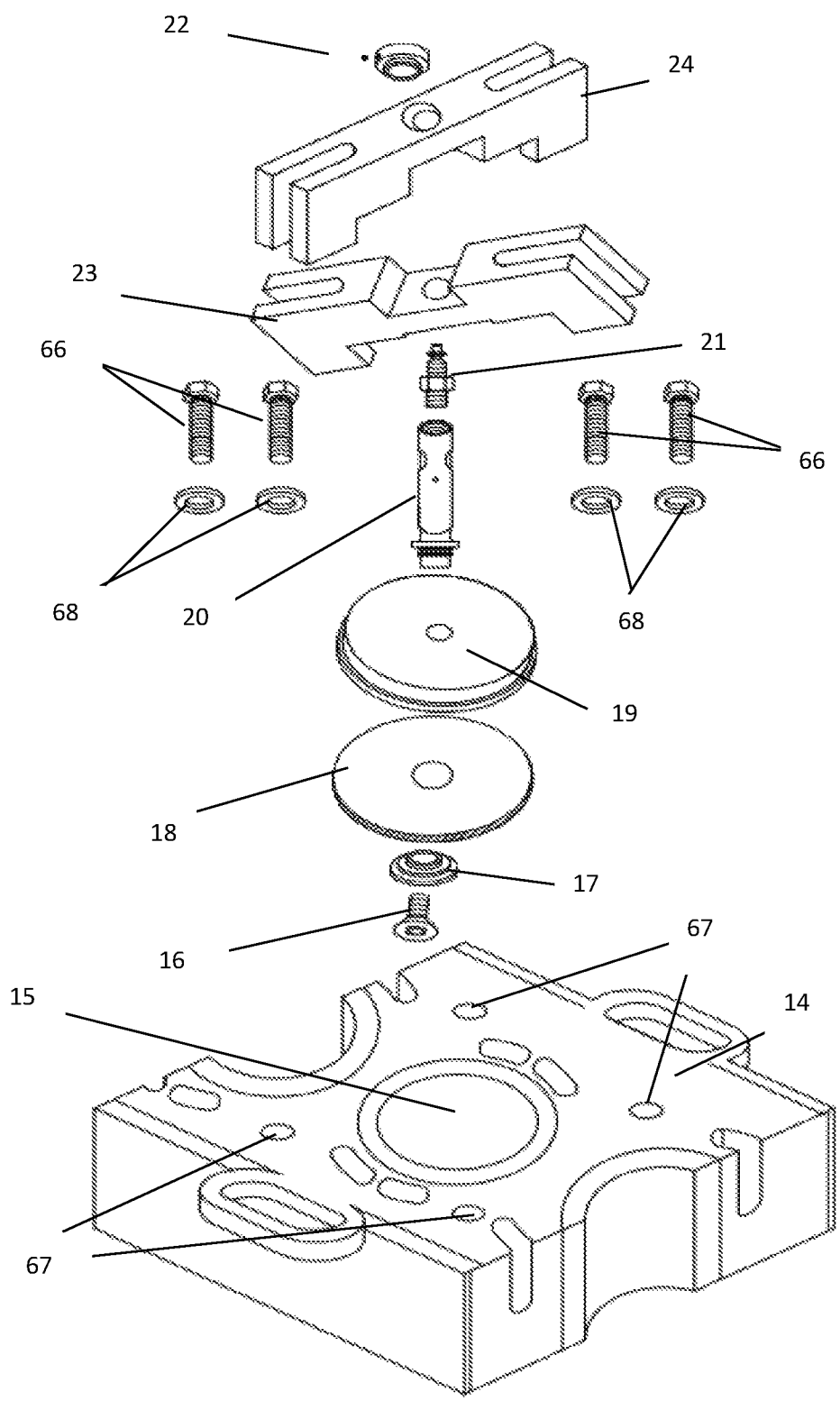
FIG. 2 shows an exploded view of the different components of the device, according to the invention, illustrated above an open internal combustion engine block, wherein said engine block is partially illustrated.
Figure 3A:
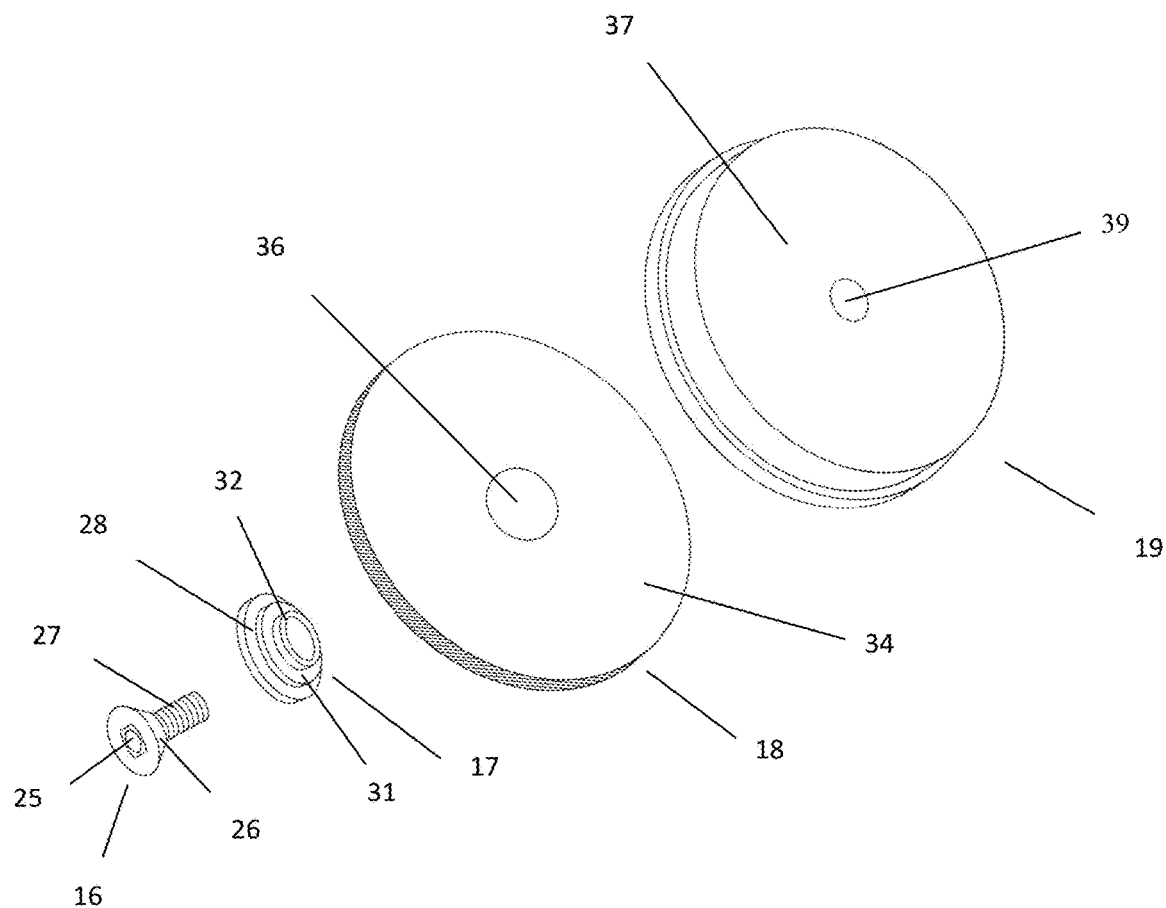
FIG. 3A illustrates an exploded view of different parts of the lower section of the device, according to the invention.
Figures 4A, 4B, 4C, 4D:
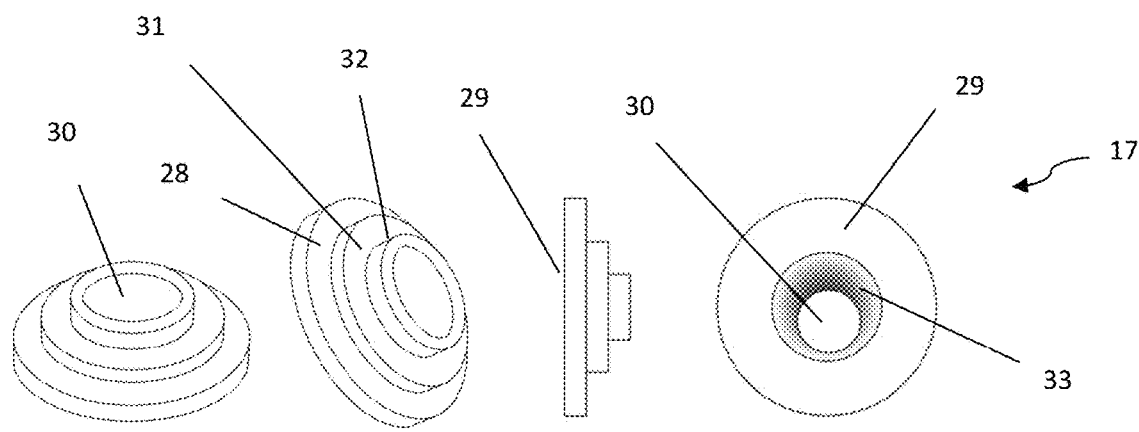
FIGS. 4A, 4B, 4C, and 4D show different perspective views of the washer, according to the invention.
Figures 7A, 7B:
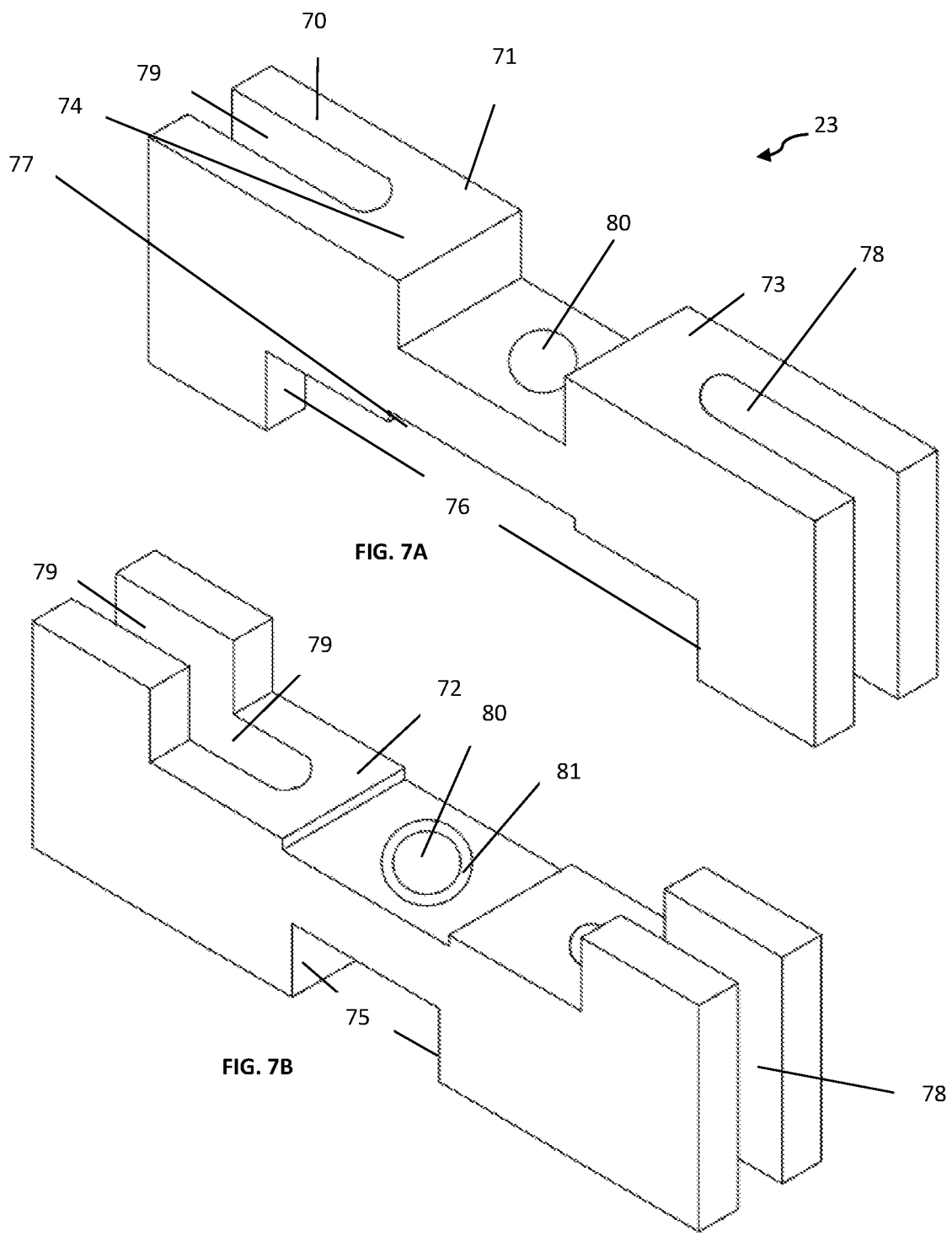
FIG. 7A illustrates a top perspective view of the lower clamp of the device, according to the invention.
FIG. 7B illustrates a bottom perspective view of the lower clamp of the device, according to the invention.
Figure 8A:
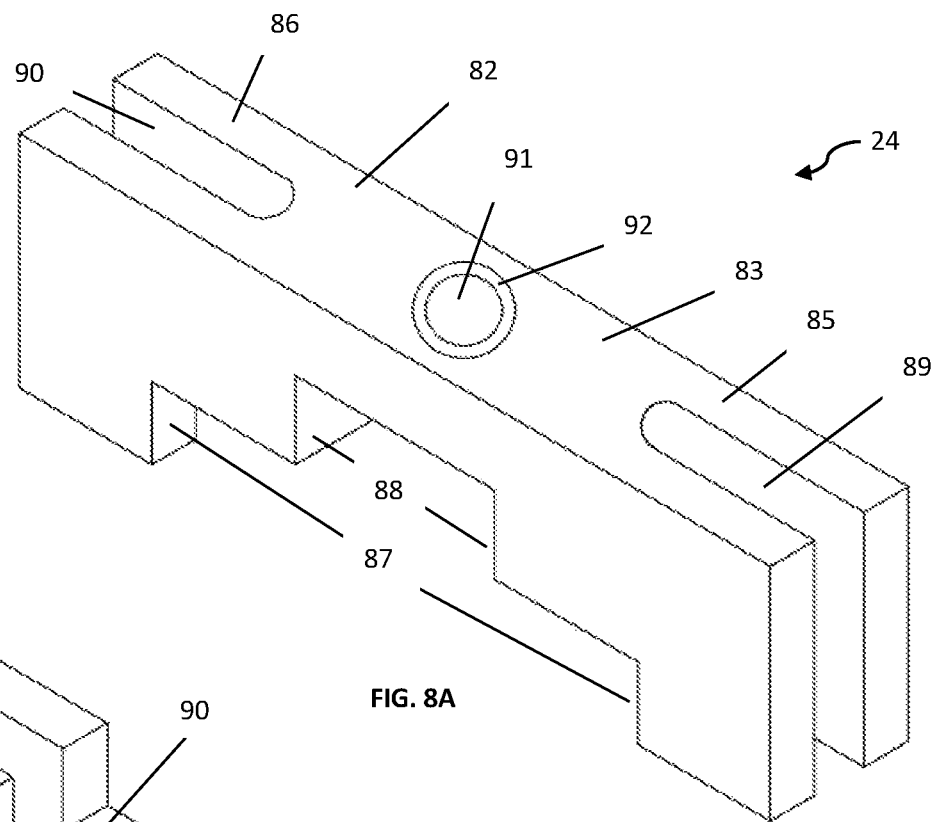
FIG. 8A illustrates a top perspective view of the upper clamp of the device, according to the invention.
Figure 8B:
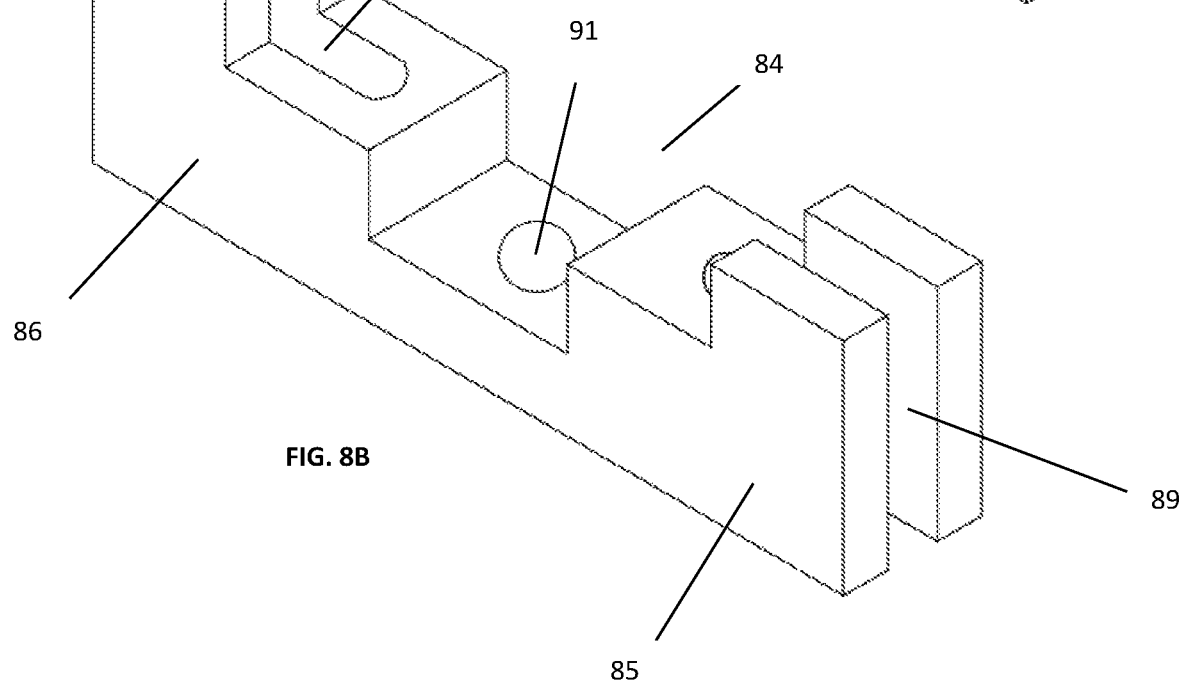
FIG. 8B illustrates a bottom perspective view of the upper clamp of the device, according to the invention.

In FIG. 2, an exploded view showing the main components of device 10 is illustrated above cylinder 15 of an open internal combustion engine block 14, which is partially illustrated. In general terms, device 10 comprises a lower section, that is positioned directly above the open cylinder 15, said lower section comprising bolt 16, washer 17, sealing unit 18, and base 19. In FIG. 3A said components or parts of the lower section of the device 10 are shown in an exploded view. Device 10 also comprises an upper section, which includes shaft 20, air hose adapter 21, and cylindrical shaft collar 22, which are illustrated in more detail in FIG. 5. Furthermore, device 10 also comprises an attachment section able to firmly secure the invention to the open combustion engine block 14, which comprises lower clamp 23 and upper clamp 24. Regarding lower clamp 23, it is illustrated in FIG. 7A and FIG. 7B. On the other hand, upper clamp 24 is shown in FIG. 8A and FIG. 8B. Details of said lower and upper clamp are discussed below.

Regarding sealing unit 18, illustrated in FIGS. 2 and 3A, it is made of a pliable and strong material suitable to provide a sealable compressed air path when subjected to pressure and placed in a tight or firmly enclosed environment. On the other hand, bolt 16, washer 17, base 19; shaft 20, air hose adapter 21, cylindrical shaft collar 22, and clamps 23 and 24 are made of a strong and rigid material capable of withstanding compressed air pressure flow while entirely keeping its constitution without any sort of deformation.

As illustrated in FIGS. 2 and 3A, bolt 16 is a centrally vented countersunk bolt, thus having a central opening 25 through its center, a countersunk section 26, and a threaded section 27. As illustrated in FIGS. 2 and 3A and more particularly, in FIGS. 4A-4D, washer 17 comprises upper flat surface 28, lower flat surface 29, and central opening 30, passing through said upper and lower surfaces 28 and 29. On upper section 28, it comprises a first rounded flange 31 and second rounded flange 32, which are concentric to central opening 30. On the other hand, on its lower flat surface 29, washer 17 comprises a countersunk section 33, surrounding the central opening 30, which is dimensioned for receiving and matching with the countersunk section 26 of the centrally vented bolt 16.

Sealing unit 18 is illustrated in FIGS. 2 and 3A, it comprises flat upper surface 34, flat lower surface 35, and central round aperture 36, located at the center of and passing through said upper and lower surfaces 34 and 35. Surfaces 34 and 35 are identical in shape and form. Similarly, base 19 is shown in said FIGS. 2, 3A, 3B and, 3C. It comprises flat upper surface 37, flat lower surface 38, and central round aperture 39, positioned on and passing through said upper and lower surfaces 37 and 38. Lower surface 38 of base 19 is seated or positioned on upper surface 34 of sealing unit 18 and since base 19 and sealing unit 18 have the same diameters, the apertures 39 and 36 of base 19 and sealing unit 18, respectively, are concentrically positioned. The diameter of central aperture 36 on sealing unit 18 is larger than the diameter of central aperture on base 39 and it is dimensioned to receive the first rounded flange 31 on top surface 28 of washer 17. On the other hand, the second rounded flange 32 of washer 17 comes out of sealing unit 18 and is inserted in aperture 39 of base 19. Vented bolt 16 is inserted into the lower surface 29 of washer 17, wherein its countersunk section 26 matches the countersunk section 33 of washer 17 and its threaded section 27 passes through the aperture 36 of sealing unit 18 and enters aperture 39 of base 19, wherein it is kept inside aperture 39 of base 19.

Figure 5:
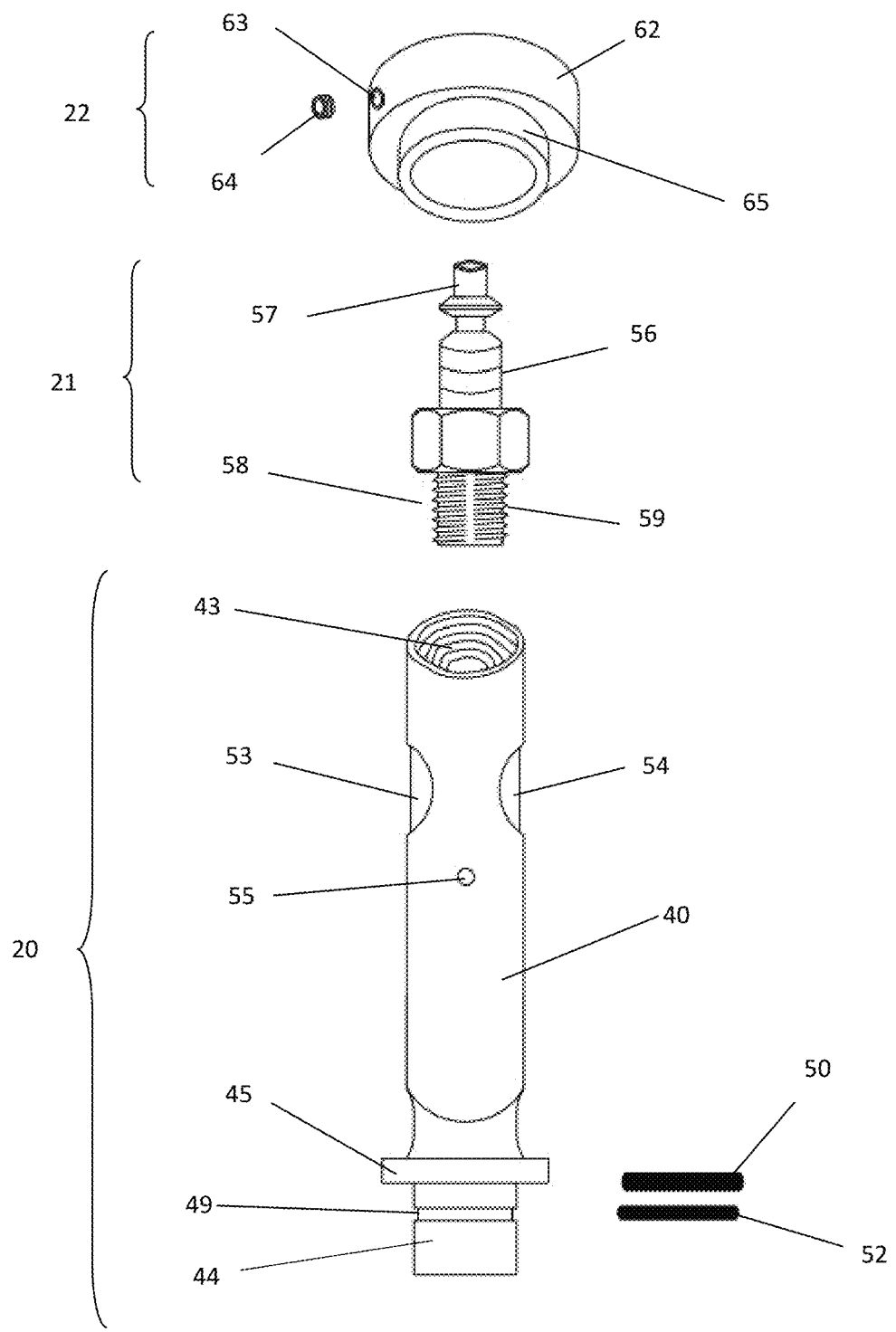
FIG. 5 illustrates an exploded view of the different parts or components of the upper section of the device, according to the invention.
Figure 6A:
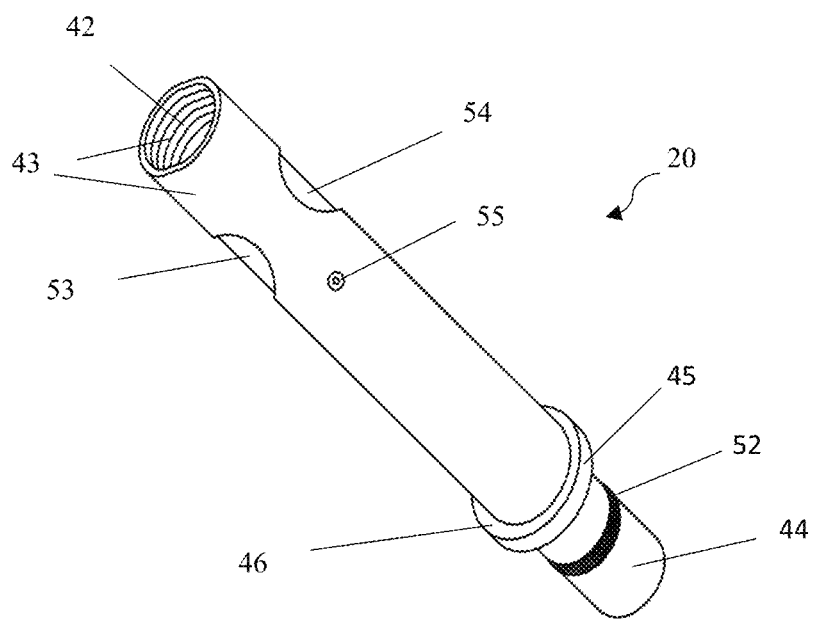
FIG. 6A illustrates a lateral top perspective view of the shaft of the device, according to the invention.
Figure 6B:
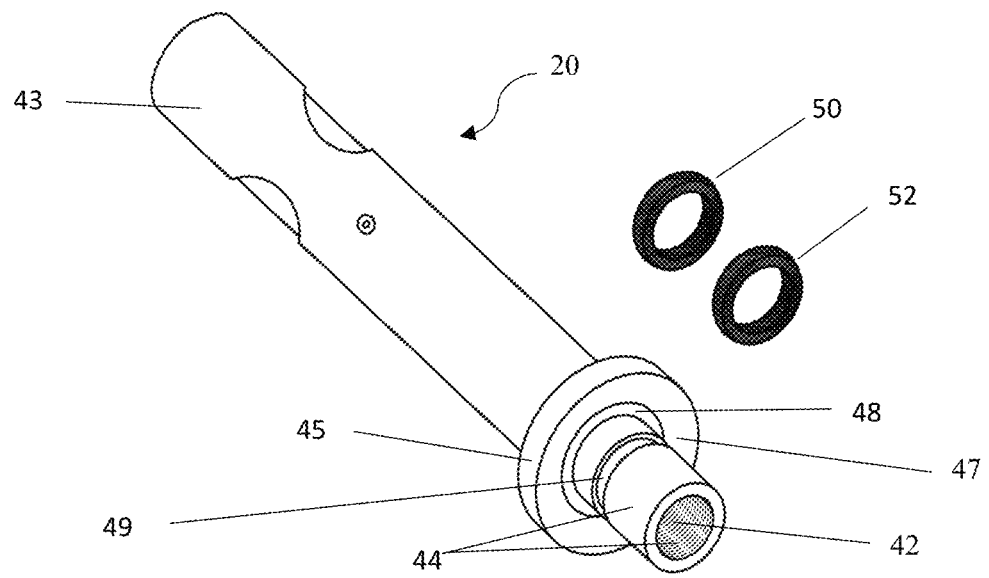
FIG. 6B illustrates a lateral front perspective view of the shaft of the device, according to the invention.

Regarding the upper section of device 10, shaft 20 is illustrated in FIGS. 5, 6A, and 6B. Particularly, in FIG. 6A, it is illustrated in a lateral top perspective view while, in FIG. 6B, it is illustrated in a lateral front perspective view. Shaft 20 comprises an elongated cylindrical main body 40, a continuous internal channel 42, through said elongated cylindrical body 40; a first internally threaded end 43, a second internally threaded end 44, as illustrated, for instance in FIGS. 5, 6A and 6B.

As illustrated in FIG. 6A an 6B, shaft 20 also comprises cylindrical flange 45 comprising an upper surface 46 and a lower surface 47, which surrounds elongated body 40 and is located at the second internally threaded end 44. At the lower surface 47 of cylindrical flange 45, shaft 20 also comprises a first O-ring channel 48, as illustrated in FIG. 6B. Furthermore, shaft 20 comprises a second O-ring channel 49, which is located below said first O-ring channel 48, located at the second internally threaded end 44, as illustrated, for instance in FIGS. 5 and 6B. It also comprises the first O-ring 50, which is dimensioned to fit and be inserted in said first O-ring channel 48; and the second O-ring 52, which is dimensioned to fit and be inserted in second O-ring channel 49. In FIG. 6A, a second O-ring channel 49 is illustrated having the first O-ring 52 already inserted on it. First and second O-rings 50 and 52, respectively, are illustrated separated from shaft 20 in FIG. 6B. Said O-rings are made of a pliable and strong material suitable to provide a sealable compressed air path when subjected to pressure and a tight or firmly enclosed environment.

Shaft 20 also comprises a first recess 53 and a second recess 54 near the first internally threaded end 43, as illustrated, for example, FIGS. 5, 6A, and 6B. Such recesses 53 and 54 are suitable ergonomic features that facilitate grasping the elongated body 40 in order to easily turning it in the process of tightening and loosening it. Similarly, shaft 20 also comprises the round recess 55 on the surface of elongated body 40.

Second internally threaded end 44 of shaft 20, as well as the lower section of shaft 20 comprising the first and the second O-rings 50 and 52 already housed in O-rings channels 48 and 49 respectively, are inserted into aperture 39 of base 19, wherein the second internally threaded section 44 is threaded and tightened to threaded end 27 of vented bolt 16; thus, confining washer 17, sealing unit 18 and base 19 in between vented bolt 16 and the lower surface 47 of the cylindrical flange 45, which is in direct contact with upper surface 37 of base 19. In this manner, continuous internal channel 42 of shaft 20 is in direct communication with the opening 25 passing through bolt 16; thus, creating a totally sealed airtight internal path that allows compressed air to flow freely through it.

As illustrated for instance, in FIG. 5, air hose adapter 21, which is commercially available and used in airflow connections, comprises a main hollow body having a first end 56 with a plugin section 57, which is ready to be connected to an air hose and, second end 58, which comprises threaded section 59. Regarding cylindrical shaft collar 22, as illustrated in for instance FIGS. 2 and 5, it comprises top section 62, having a threaded lateral aperture 63, security screw 64, which is intended to be fastened into said threaded lateral aperture 63 and bottom section 65, which has a narrower external diameter than the diameter of top section 62. In order to secure cylindrical shaft collar 22 to elongated body 40 of shaft 20, security screw 64 is fastened into threaded lateral aperture 63 until the tip end of said screw 64 is received into round recess 55.

Device 10 also comprises lower clamp 23 and upper clamp 24, which are a set of two coordinated or matching clamps capable of facilitating fastening and securing the device 10 above the open cylinder 15 on engine block 14 by providing channels that receive and support the engine head bolts 66, previous to insert, thread and tight said engine head bolts 66, into the threaded holes 67 of the engine block 14.

Lower clamp 23 is illustrating in FIGS. 7A and 7B, wherein a top perspective and a bottom perspective views of said lower clamp 23 are shown, respectively. It comprises the main elongated rectangular body 70, top section 71, bottom section 72, right side 73, and left side 74. It also comprises first indentation 75, which is located at the top section 71, between right side 73 and left side 74; second indentation 76, which is located at the bottom section 72 between right side 73 and left side 74 and third shallow indentation 77, located at the center of second indentation 76 and parallel to first indentation 75. Lower clamp 23 also comprises first elongated channel 78, which is located at right side 73 and passes throughout the top and bottom sections 71 and 72, respectively; and second elongated channel 79, at the left side 74 and passing throughout top section 71 and bottom section 72. It also comprises circular aperture 80, which is located at the center of said elongated rectangular body 70 and passes throughout the top section 71 and the bottom section 72. Circular aperture 80 comprises a counterbore section 81, positioned at its exit from the bottom section 72.

A top perspective view and a bottom perspective view of upper clamp 24 are illustrated in FIG. 8A and FIG. 8B, respectively. It comprises main elongated rectangular body 82, having a top section 83, bottom section 84, right side 85, left side 86, first indentation 87, which is located at the bottom section 84 between right side 85 and left side 86; second indentation 88, is located at the center of the first indentation 87; first elongated channel 89, positioned at the right side 85 and passing throughout top section 83 and bottom section 84; second elongated channel 90 located at left side 86 and passing throughout top section 83, bottom section 84. It also comprises circular aperture 91, located at the center of the said elongated body, that passes throughout top section 83 and bottom section 84, said circular aperture 91 having a counterbore 92, located at the top section 83.

As illustrated in FIG. 9A, shaft 20 is inserted into the lower clamp 23 via its circular aperture 80 throughout bottom section 72, thus allowing that the cylindrical flange 45 on shaft 20 to be positioned inside the counterbore section 81 of circular aperture 80 of said lower clamp 23 at the same time that, the left and right extremes of the second indentation 76 are in direct contact with the upper surface 37 of base 19.

Similarly, shaft 20 is also inserted into upper clamp 24 through said circular aperture 91, via said lower section 84 of said second clamp 24. As a consequence, upper clamp 24 is superimposed on lower clamp 23 in a cooperative manner by inserting first indentation 87 of upper clamp 24 inside the first indentation 75 of the lower clamp 23 while placing the left and right extremes of the second indentation 87 of upper clamp 24 in direct contact with the upper surface 37 of the base 19 and setting elongated channels 78, 79, 89 and 90 around base 19.

Lower and upper clamps 23 and 24 are kept confined to the exterior of shaft 20 by inserting cylindrical shaft collar 22 into the shaft 20 until bottom section 65 of said collar 22 is inserted into the counterbore section 92 on the top section 83 of upper clamp 24, and the security screw 64 is then tightened on lateral threaded aperture 63 until the tip of screw 64 is received on indentation 55 on shaft 20, as illustrated in FIG. 9A.

As illustrated in FIG. 9B, even though upper and lower clamps 23 and 24 cannot move upwardly in reference to the upper section of shaft 20; however, they are able to move laterally, in left or right directions in reference to shaft 20. In this manner, elongated channels 78, 79, 89, and 90, surrounding base 19 are able to be positioned by the User above the threaded holes 67 on the open engine block 14, regardless of the relative position or distances of said threaded holes 67 in reference to the cylinder 15; thus, overcoming the fact that different internal combustion engine manufactures place said engine threaded holes 67 at different relative positions or distances in reference to the cylinder 15.

The first internally threaded end 43 of shaft 20 is tightened to threaded section 59 of the air hose adapter 21. Thus, the internal channel of the air hose adapter 21 is in direct communication with the internal channel 42 of shaft 20. Therefore, since continuous internal channel 42 of shaft 20 is also in direct communication with the opening 25 passing through bolt 16, a sealed airtight channel that allows compressed air to flow throughout the interior of invention 10 is created.

As indicated above, device 10 is used in connection with a dual gauge down lock tester 12, as the one illustrated in FIG. 1. Such tester is commercially available, well known in the art and, contrary to the conditions under which device 10 is used, said tester 12 is commonly used in the detection of leaks in internal combustion engines having its head properly assembled and while maintaining the piston of the tested cylinder at the higher point in the cycle.

FIGS. 12A and 12B illustrate the use of device 10 in detecting leaks in cylinder 15 of an open engine block 14, wherein the engine head and other components of the upper section of the internal combustion engine have been removed or dissembled. In this manner, any potential leaks detected in the test will only and exclusively reflect leaks originated from the cylinder under testing or its internal components such as the piston and the piston rings.

In operational terms, as illustrated in FIG. 12A, device 10 is placed above cylinder 15, on an open engine block 14 having its piston set or positioned at its extreme lower position, near the crank, which is also known as the lower point of the cycle or Outer Dead Centre (ODC); it is then secured to said block 14 by inserting each one of the engine head bolts 66 in a supporting washer 69 and through each one of the elongated channels 78, 79, 89 and 90 and further threatening and tightening each one of said engine head bolts 66 into a particular threaded engine hole 67, as illustrated in FIG. 12A.

Figure 10A:
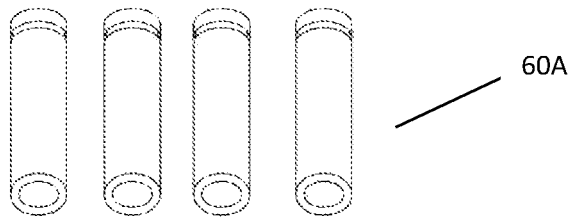
FIGS. 10A, 10B, and 10C illustrate perspective views of different spacers used to adapt engine head bolts to the invention if required in the installation of the invention above a cylinder.
Figure 10B:
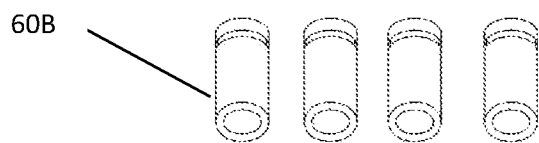
Figure 10C:
Figures 11, 11B:
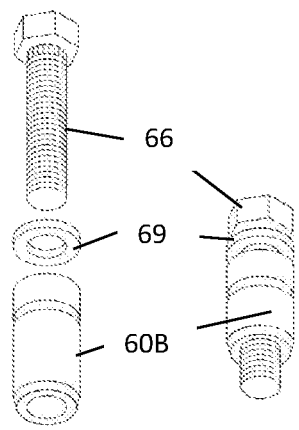

In some instances, and depending on the shape and dimensions of the engine head bolts 66, they may be inserted in suitable and commercially available bolt spacers 60, such as those illustrated in FIGS. 10 A to 10C in order to further secure said head bolts to the elongated channels 78, 79, 89, and 90. FIGS. 11A and 11B illustrate one suitable way to assemble the head bolt 66 into a supporting washer 69 and spacer 60, previous to insert said head bolt 66 into one of the elongated channels 78, 79, 89, and 90 on device 10. FIG. 12B illustrates device 10 already installed above cylinder 15 on headless engine block 14 wherein head blots have been inserted into spacers 60.

Device 10 is cooperatively coupled to a dual gauge down leak tester 12 by connecting plugin section 57 of air hose adapter 21 to the exit hose 94 of a dual gauge leak tester 12. The dual gauge tester 12 is then connected to a compressed air source, such as a compressor 96. In this manner, device 10 is connected directly to the leak tester 12 and indirectly to a pressurized air source, such as a compressor 96.

Once said connection is completed, the leak down test is performed following the same process it is performed when using a dual leak down tester in a conventional manner: the amount or percentage of incoming air pressure from the compressed air source is adjusted and predetermined using the first gauge of the tester 12, and the pressurized air coming from the tester 12 is allowed to enter to the cylinder 15 through device 10; the percentage of air pressure escaping from inside cylinder 15 is measured by the second gauge of tester 12 as a consequence of any leakage,—if any—in the cylinder that is produced or due to or taking place in exclusively the cylinder walls, piston or the rings of the piston, in other words, in any area under the lower section of the cylinder block.

Finally, while the present invention has been described in terms of particular embodiments and applications, in both summarized and detailed forms, it will be understood that many substitutions, changes, and variations in the described embodiments, applications, and details of the novel tool illustrated herein and of its operation can be made by those skilled in the art to adapt it to various usages and conditions, without departing from the spirit of this invention. As such, these changes and modifications are properly, equitably, and intended to be within the full range of equivalence of the following. While the invention has been described in conjunction with some embodiments, it is to be understood that many alternatives, modifications, and variations will be apparent to those skilled in the art considering the foregoing description. Accordingly, the invention is intended to embrace all such alternatives, modifications, and variations falling within the spirit and scope of the appended claims.

What is claim is:

1. A device for detecting leaks in engine cylinders in an open internal combustion engine having the engine head dismantled from the engine block, said device comprising:

a) a dual gauge leak down tester;
b) an air hose adapter, coupled to the dual gauge leak down tester;
c) a hollow shaft comprising:
   an elongated body;
   a first internally threaded end coupled to said air hose adapter;
   a second internally threaded end having a cylindrical flange comprising an upper surface and a lower surface;
   a first O-ring channel located at the lower surface of the cylindrical flange;
   a second O-ring channel located below said first O-ring channel;
d) a first O-ring dimensioned to fit and inserted in said first O-ring channel on the hollow shaft;
e) a second O-ring dimensioned to fit and inserted in said second O-ring channel on the hollow shaft;
f) a supporting section comprising:
   a base comprising an upper surface, a lower surface, a central rounded aperture passing through said upper and lower surfaces and wherein the second internally threaded end of the shaft is inserted on the central rounder aperture of said base via the upper surface of said base;
   a sealing unit comprising an upper surface placed under the lower surface of the base, a lower surface, and a central rounded aperture passing through said upper and lower surfaces and placed in a concentric position with respect to the central rounded aperture of said base;
   a countersunk washer comprising a top surface located on top of the lower surface of said sealing unit, a bottom surface, and a central rounded aperture passing through said top surface and said bottom surface, wherein the bottom surface comprises a central countersunk section;
   a centrally vented countersunk bolt inserted through the countersunk of said washer, passing through the central rounded apertures of the sealing unit and the base and threaded to the second internally threaded end of the hollow shaft, while confining the washer, the sealing unit and the base between said bolt and the hollow shaft and creating a continuous internal airtight path passing through the dual gauge leakdown tester, the air hose adapter, the hollow shaft and the vented countersunk bolt and wherein said supporting section may be positioned above a cylinder in order to deliver pressured air flow inside said cylinder;
g) a security section comprising:
   a lower clamp comprising:
      a top surface, a bottom surface, a right side, a left side,
      an elongated channel located at the right side and passing through said top surface and said bottom surface, an elongated channel located at the left side passing through said top surface and said bottom surface, a circular aperture located at the center of the lower clamp that passes through the top surface and the bottom surface and wherein the hollow shaft has been inserted in said circular aperture via the bottom surface of the lower clamp;
   an upper clamp comprising:
      a top surface, a bottom surface, a right side, a left side, an elongated channel located at the right side and passing through said top surface and said bottom surface, an elongated channel located at the left side and passing through said top surface and said bottom surface, a circular aperture that passes through the top surface and the bottom surface and wherein the hollow shaft has been inserted through said circular aperture of the upper clamp via said lower surface of the upper clamp and wherein the upper clamp is superimposed on the lower clamp while positioning the elongated channels of the lower clamp and the elongated channels of the upper clamp around the base, wherein said elongated channels may be laterally rotated around the base and wherein each one of the engine head bolts may be inserted through each one of said elongated channels and further threaded into threaded engine holes in order to secure said supporting section to the engine block;

h) a cylindrical shaft collar comprising:
an upper section comprising a threaded lateral aperture;
a security screw fastened into said threaded lateral aperture;
a lower section having a narrower external diameter than the diameter of the upper section; and
wherein the hollow shaft has been inserted into said cylindrical shaft collar via the lower section and the security screw has been tightened in order to confine the upper and lower clamps between said cylindrical shaft collar and the base; and
wherein detecting of leaks in a cylinder is achieved by coupling a pressurized air source to the leak-down tester and allowing pressurized air to pass to the interior of the cylinder through the leak-down tester and the internal airtight path formed by the air hose adapter, the hollow shaft and the vented countersunk bolt, and then measuring the percentage of air pressure entering the cylinder and the percentage of air pressure coming out the cylinder by means of the gauges of the leak-down tester.

2. The device as recited in claim 1, further comprising a counterbore section on the bottom surface of the lower clamp wherein the upper surface of the cylindrical flange is housed.

3. The device as recited in claim 1, further comprising a counterbore section on the top surface of the upper clamp wherein the lower section of the cylindrical shaft collar is housed.

4. The device as recited in claim 3, further comprising a first rounded flange and a second rounded flange on the top surface of the washer, wherein said first and second flanges are concentric and wherein said first rounded section is housed in the rounded aperture of the sealing unit and said second rounded flange is housed in the central aperture of the base.

5. The device as recited in claim 4, further comprising ergonomic indentations in the elongated body of the hollow shaft.

6. The device as recited in claim 5, further comprising ergonomic indentations in the elongated body of the hollow shaft.

7. A device for detecting leaks in engine cylinders in an open internal combustion engine having the engine head dismantled from the engine block, said device comprising:
a) a shaft comprising:
an elongated cylindrical main body;
a continuous internal channel along said elongated cylindrical main body;
a first internally threaded end;
a second internally threaded end;
a rounded indentation;
a cylindrical flange around said elongated body and located at said second end; said cylindrical flange comprising an upper surface and a lower surface;
a first O-ring channel located at the lower surface of said cylindrical flange;
a second O-ring channel located below said cylindrical flange;
b) a first O-ring dimensioned to fit and inserted in said first O-ring channel;
c) a second O-ring dimensioned to fit and inserted in said second O-ring channel;
d) an air hose adapter comprising:
a first end comprising a plugin section ready to be connected to air hose;
a second end comprising a threaded section threaded to the first internally threaded end of the hollow shaft;
e) a supporting section comprising:
a base comprising an upper surface, a lower surface; a central rounded aperture passing through said upper and lower surfaces and wherein the second internally threaded end of the hollow shaft is inserted on the central rounded aperture of the base via the upper surface of said base until the lower surface of the cylindrical flange is in contact with the upper surface of the base;
a sealing unit comprising an upper surface placed under the lower surface of the base, a lower surface, and a central rounded aperture passing through said upper and lower surfaces and placed in a concentric position with respect to the central rounded aperture of said base;
a countersunk washer comprising a top surface located on top of the lower surface of said sealing unit, a bottom surface, and a central rounded aperture passing through said top surface and said bottom surface, and a countersunk section located at the bottom surface and surrounding said central rounded aperture of the sealing unit;
a centrally vented countersunk bolt inserted through the countersunk section of the washer and passing through the central rounded apertures of the sealing unit and the base and threaded to the second internally threaded end of the hollow shaft, while confining the washer, the sealing unit and the base between said bolt and the lower surface of said cylindrical flange on the hollow shaft and creating a continuous internal airtight path passing through the air hose adapter, the hollow shaft and the vented countersunk bolt and wherein said supporting section may be positioned above a cylinder in order to deliver pressured air flow inside said cylinder;
f) a security section comprising:
a lower clamp comprising a top surface, a bottom surface, a right side, a left side, an elongated channel located at the right side and passing through said top surface and said bottom surface, an elongated channel located at the left side passing through said top surface and said bottom surface, a circular aperture located at the center of t lower clamp that passes through the top surface and the bottom surface and wherein the cylindrical flange of the hollow shaft has been inserted in said central circular aperture via the bottom surface of the lower clamp;

g) an upper clamp comprising:
  a top surface, a bottom surface, a right side, a left side, an elongated channel located at the right side and passing through said top surface and said bottom surface, an elongated channel located at the left side and passing through said top surface and said bottom surface, a circular aperture that passes through rough the top surface and the bottom surface and wherein the hollow shaft has been inserted through said circular aperture of the upper clamp via said lower surface of the upper clamp and wherein the upper clamp is superimposed on the lower clamp while positioning the elongated channels of the lower clamp and the elongated channels of the upper clamp around the base, wherein said elongated channels may be laterally rotate around the base and wherein each one of the engine head bolts may be inserted through each one of said elongated channels and further threaded into threaded engine holes in order to secure said supporting section to the engine block;
h) a cylindrical shaft collar comprising:
  a top section with a threaded lateral aperture;
  a security screw fastened into said threaded lateral aperture;
  a bottom section having a narrow external diameter than the external diameter of the top section; and
  wherein the hollow shaft has been inserted into said cylindrical shaft collar via the bottom section, until the bottom section of said cylindrical shaft collar is inserted into the central rounded aperture of the upper clamp and the security screw is inserted and tightened in the rounded indentation of the hollow shaft in order to confine the upper and lower clamps between said cylindrical shaft collar and the base;
  wherein the device may be coupled to a dual gauge leak down tester by coupling the plugin section of the air hose adapter with the leak down tester;
  wherein the internal channel of the air hose adapter is in direct communication with the continuous internal channel of the hollow shaft, which is also in direct communication with the central aperture of the bolt, thus creating an airtight path that allows the flow of pressured air; and
  wherein the detection of leaks in a cylinder is achieved by coupling a pressurized air source to the leak down tester already connected to the device and further allowing pressurized air to enter into the interior of the cylinder via the device and further measuring the percentage of air pressure entering the cylinder and the percentage of air pressure coming out from the cylinder by means of the gauges of the leak-down tester.

8. The device as recited in claim 7, further comprising a counterbore section on the bottom surface of the lower clamp wherein the upper surface of the cylindrical flange is housed.

9. The device as recited in claim 8, further comprising a counterbore section on the top surface of the upper clamp wherein the lower section of the cylindrical shaft collar is housed.

10. The device as recited in claim 9, further comprising a first rounded flange and a second rounded flange on the top surface of the countersunk washer, wherein said first and second flanges are concentric and wherein said first rounded flange is housed in the rounded aperture of the sealing unit and said second rounded flange is housed in the central aperture of the base.

11. The device as recited in claim 10, further comprising ergonomic indentations in the elongated body of the hollow shaft.

* * * * *